(12) United States Patent
Huang et al.

(10) Patent No.: US 8,001,806 B2
(45) Date of Patent: Aug. 23, 2011

(54) INDIRECT HEAT TYPE DOUBLE-CLAD CRYSTAL FIBER FABRICATION METHOD

(75) Inventors: Kwang-Yao Huang, Kaohsiung County (TW); Chia-Yao Lo, Taipei County (TW); Sheng-Lung Huang, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 0 days.

(21) Appl. No.: 12/659,792

(22) Filed: Mar. 22, 2010

(65) Prior Publication Data
US 2010/0229604 A1    Sep. 16, 2010

Related U.S. Application Data

(63) Continuation of application No. 11/590,778, filed on Nov. 1, 2006, now abandoned.

(51) Int. Cl.
*C03B 37/01* (2006.01)

(52) U.S. Cl. .............................. 65/384; 65/412; 65/392

(58) Field of Classification Search .................... 65/412, 65/384, 392, 407
See application file for complete search history.

(56) References Cited

U.S. PATENT DOCUMENTS

| | | | |
|---|---|---|---|
| 3,877,912 A * | 4/1975 | Shiraishi et al. ................ 65/412 |
| 4,289,516 A * | 9/1981 | Krohn ............................ 65/405 |
| 4,407,668 A * | 10/1983 | Aulich et al. .................. 65/412 |
| 4,961,768 A * | 10/1990 | Djeu ............................... 65/392 |
| 7,266,259 B1 * | 9/2007 | Sumetsky ....................... 385/12 |
| 7,306,376 B2 * | 12/2007 | Scerbak et al. ................ 385/76 |
| 2006/0102377 A1 * | 5/2006 | Johnson et al. ............... 174/108 |
| 2006/0174658 A1 * | 8/2006 | Huang et al. ................... 65/390 |

* cited by examiner

*Primary Examiner* — John Hoffmann
(74) *Attorney, Agent, or Firm* — Bacon & Thomas, PLLC

(57) ABSTRACT

A double-clad optical fiber fabrication method including the steps of: preparing a crystal fiber, inserting the crystal fiber into a silica capillary, attaching a sapphire tube to the periphery of the silica capillary, and applying a laser beam to the sapphire tube to increase the temperature of the sapphire tube and to further fuse the silica capillary with thermal radiation to have the fused silica capillary be wrapped about the crystal fiber, thereby forming the desired double-clad optical fiber.

8 Claims, 4 Drawing Sheets

INDIRECT HEAT TYPE DOUBLE-CLAD CRYSTAL FIBER FABRICATION METHOD

This application is a continuation application of co-pending U.S. application Ser. No. 11/590,788, filed Nov. 1, 2006 of which the entire disclosure of the pending, prior application is hereby incorporated by reference.

BACKGROUND OF THE INVENTION

1. Field of the Invention

The present invention relates to the fabrication of optical fiber for signal transmission and more particularly, to an indirect heat type double-clad crystal fiber fabrication method.

2. Description of the Related Art

There are known many methods intensively used for making glass fibers. In a popularly known method, a glass cylinder is set in the top of a drawing tower, a high-temperature heating stove is used to indirectly heat the glass cylinder to a softened state, and then the softened glass cylinder is drawn downwards into a glass fiber. A glass fiber made according to this method has the advantages of low transmission loss, uniform diameter and rapid growth. However, this method is not practical for making single-crystal optical fiber because rapid growth results in a poor crystal quality.

There is also known laser heated pedestal growth method. This method eliminates the drawback of a drawer tower of being unable to grow single-crystal optical fiber, and also overcomes semiconductor manufacturing process's problem of being unable to be fiberized. A double-clad crystal fiber made subject to laser heated pedestal growth method has optimal mechanical characteristics, sufficient to bear watt grade pumping power and fusible with glass fiber to constitute a full-optical network system. Further, a double-clad crystal fiber nowadays can be made having the core as small as 20 microns and the fiber length as long as 6 cm. When pumped at wavelength 1064 nm and power 1.16 watt, it enables signal light of wavelength 1047 nm to produce 16 dB signal gain. If the core can be reduced to 10 microns, more than 30 dB signal gain could be obtained.

However, due to the power variation problem (±5%) of laser heated pedestal growth method, it is not easy to heat a glass cylinder directly with a laser beam for growing a double-clad optical fiber having the core smaller than 20 microns while maintaining the diameter in uniformity.

SUMMARY OF THE INVENTION

The present invention has been accomplished under the circumstances in view. It is one object of the present invention to provide an indirect heat type double-clad optical fiber fabrication method, which is practical to fabricate a double-clad optical fiber having a uniform diameter and a core diameter smaller than 10 microns.

To achieve this object of the present invention, the double-clad optical fiber fabrication method double-clad optical fiber fabrication method is as follows: preparing a crystal fiber, and then inserting the crystal fiber into a silica capillary, and then attaching a sapphire tube to the periphery of the silica capillary, and then applying a laser beam to the sapphire tube to increase the temperature of the sapphire tube and to further fuse the silica capillary with thermal radiation to have the fused silica capillary be wrapped about the crystal fiber, thereby forming the desired double-clad optical fiber.

DETAILED DESCRIPTION OF THE INVENTION

An indirect heat type double-clad optical fiber fabrication method in accordance with the present invention is as follows:

Prepare a crystal fiber at first, and then insert the crystal fiber into a silica capillary, and then attach a sapphire tube to the periphery of the part of the silica capillary to be heated, and then apply a laser beam to the sapphire tube to increase the temperature of the sapphire tube and to further fuse the silica capillary with thermal radiation so that the fused silica capillary is wrapped about the crystal fiber, forming the desired double-clad optical fiber.

Figure 1:
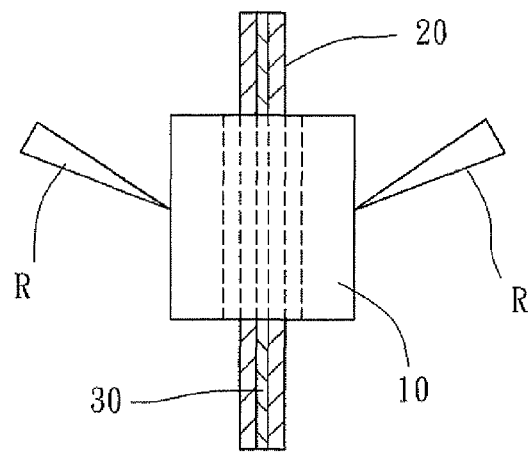
FIG. 1 is a schematic drawing, showing a Cr:YAG crystal fiber with a silica capillary inserted in a sapphire tube and a laser beam applied to the sapphire tube for the growth of a double-clad optical fiber according to the present invention.
Figure 2:
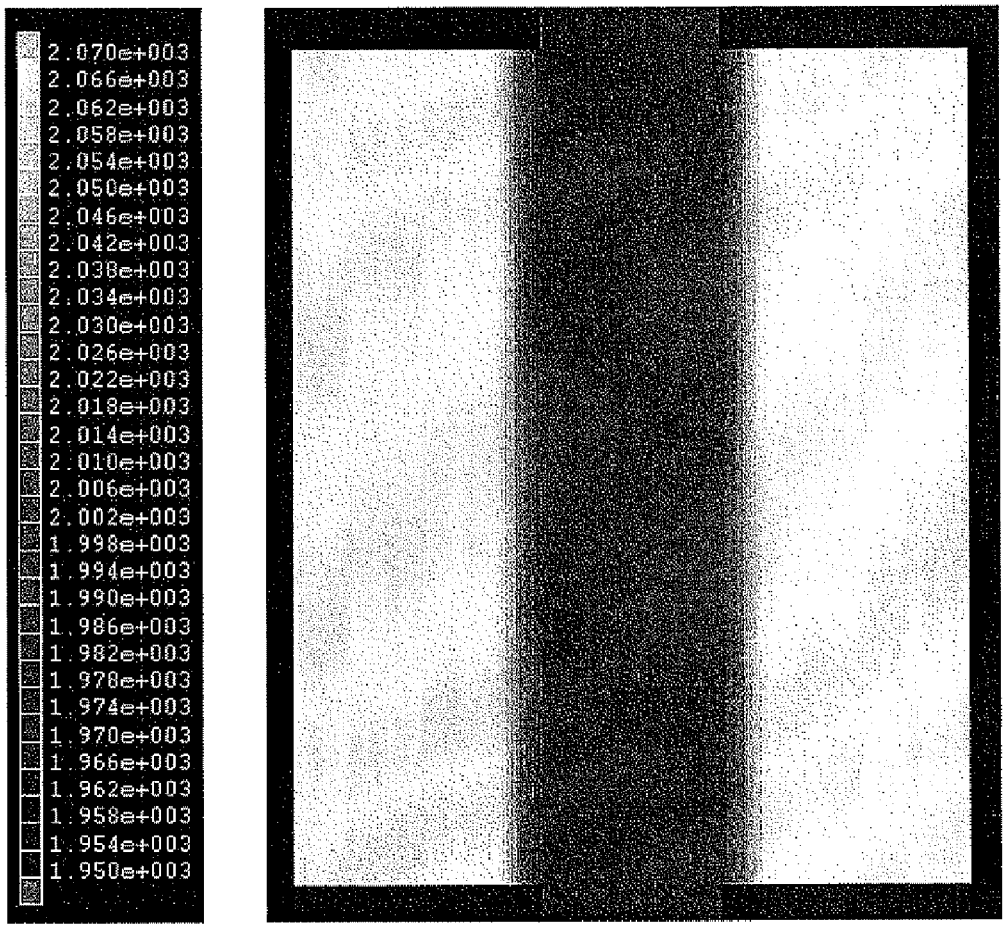
FIG. 2 is a 2D temperature distribution chart obtained by means of insertion of a silica capillary and a Cr:YAG crystal fiber in a sapphire tube and heating of the sapphire tube with laser subject to finite element method according to the present invention.
Figure 3:
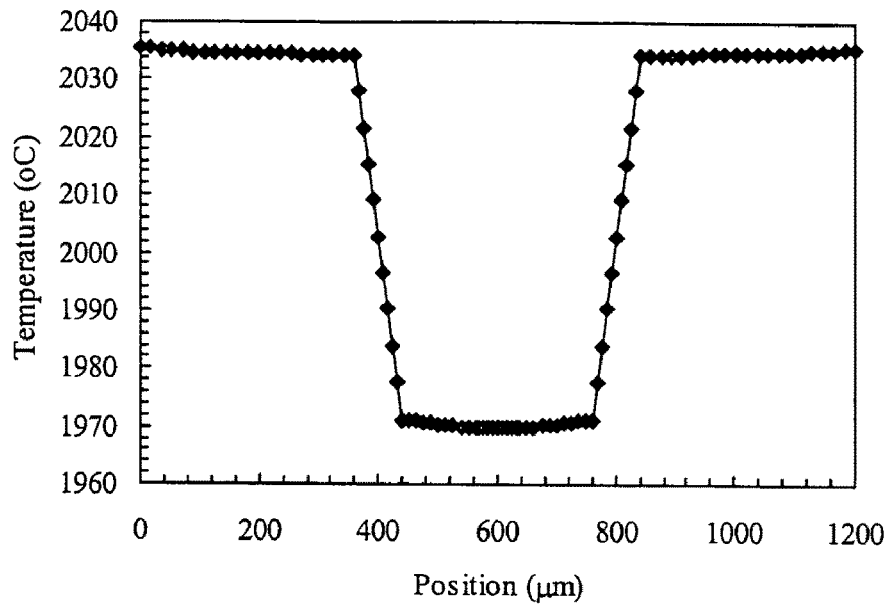
FIG. 3 is a single dimensional temperature distribution chart obtained by means of insertion of a silica capillary and a Cr:YAG crystal fiber in a sapphire tube and heating of the sapphire tube with laser subject to finite element method according to the present invention.

Referring to FIG. 1, before actual growth, finite element method was employed to simulate 2D temperature distribution by means of insertion of a silica capillary 20 and a Cr:YAG crystal fiber 30 in a sapphire tube 10 and heating of the sapphire tube with laser R. In this test, the sapphire tube has the length of 1.5 millimeters, the outer diameter of 1.2 millimeters, and the inner diameter of 0.48 millimeters. The silica capillary has the length of 100 millimeters, the outer diameter of 0.32 millimeter, and the inner diameter of 0.076 millimeter. Cr:YAG crystal fiber has the diameter of 0.076 millimeter. Because focused laser beam is applied to an annular heating zone of 0.44 millimeter on the sapphire tube, the temperature distribution is axis symmetrical. The result was as shown in FIGS. 2 and 3. As illustrated, the temperature variation from the inside toward the outside is within 1° C. This explains an excellent thermal capacitive effect that helps smooth heating of the silica capillary to grow a double-clad optical fiber having a uniform diameter.

Figure 4:
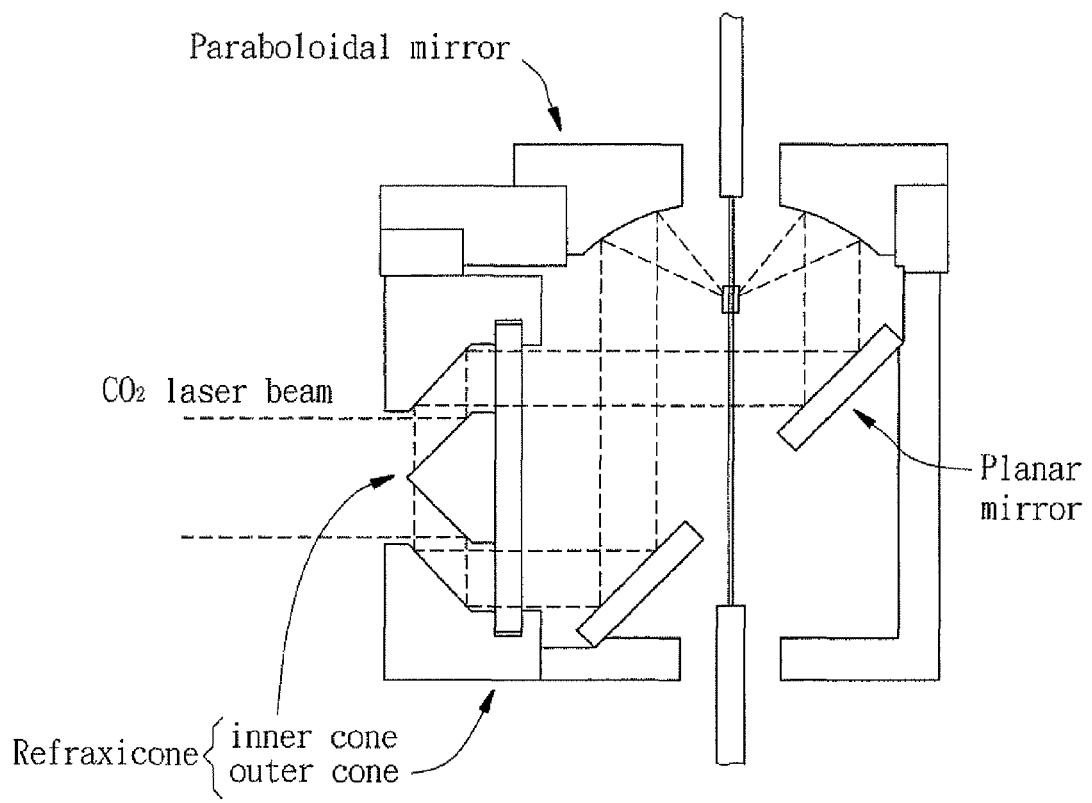
FIG. 4 illustrates the growth of crystal and the related equipment subject to LHPG method according to the present invention.

FIG. 4 illustrates the growth of crystal and the related equipment subject to LHPG method. By means of the application of the related equipment to match with different drawing and pushing speed ratios, different contraction ratios can be obtained. The invention also uses this equipment. The actual performance is as follows:

At first, prepare a Cr:YAG crystal fiber having the diameter of 0.07 millimeter, then insert the Cr:YAG crystal fiber into a silica capillary of outer diameter 0.32 millimeter and inner diameter 0.076 millimeter, and then set a sapphire tube of length 1.5 millimeter, outer diameter 1.2 millimeter and inner diameter 0.48 millimeter in the laser focus, and then apply $CO^2$ laser to the sapphire tube within the height about 0.44 millimeter to produce thermal radiation, thereby heating the silica capillary, causing the fused silica capillary to be wrapped about the crystal fiber, and therefore the desired double-clad optical fiber is thus obtained.

The crystal fiber material can be glass or crystal. According to the present invention, the Cr:YAG crystal fiber is used as a thermal capacitor that stabilizes wave motion of $CO^2$ laser, and is free from the wave motion of laser power for heating the silica capillary indirectly to grow a double-clad crystal fiber having a uniform diameter and a core smaller than 10 micrometer. The laser power required for heating silica capillary indirectly with thermal radiation is about one tenth of the laser power required for heating silica capillary directly with laser beam.

Figure 5:
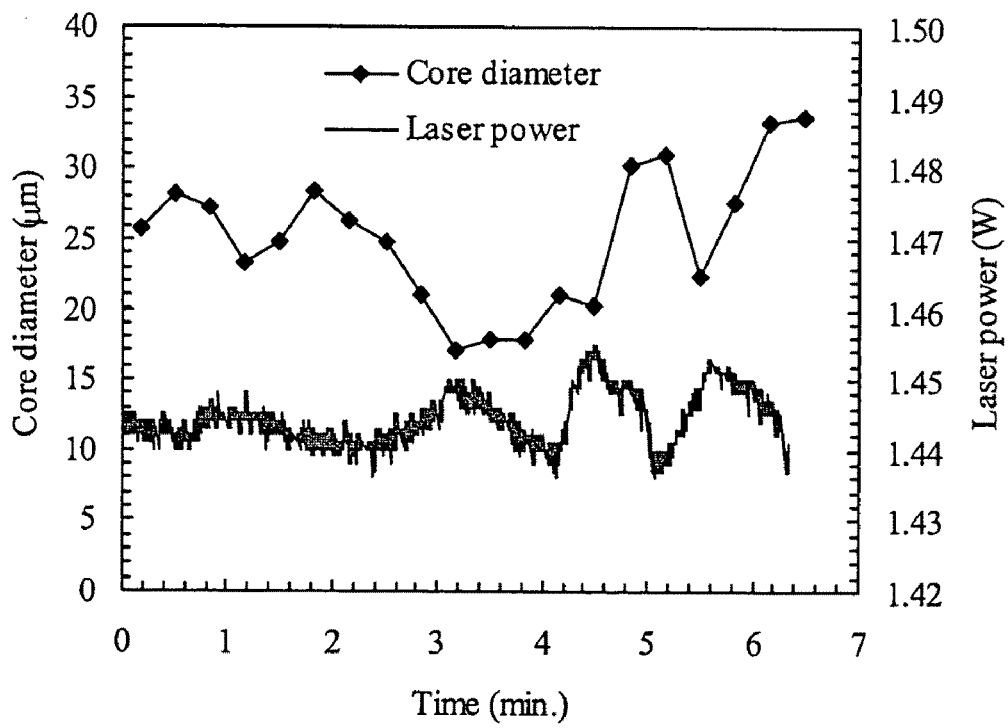
FIG. 5 is a core diameter-laser power curve obtained from the fabrication of a double-clad crystal fiber by means of direct heating according to the present invention.
Figure 6:
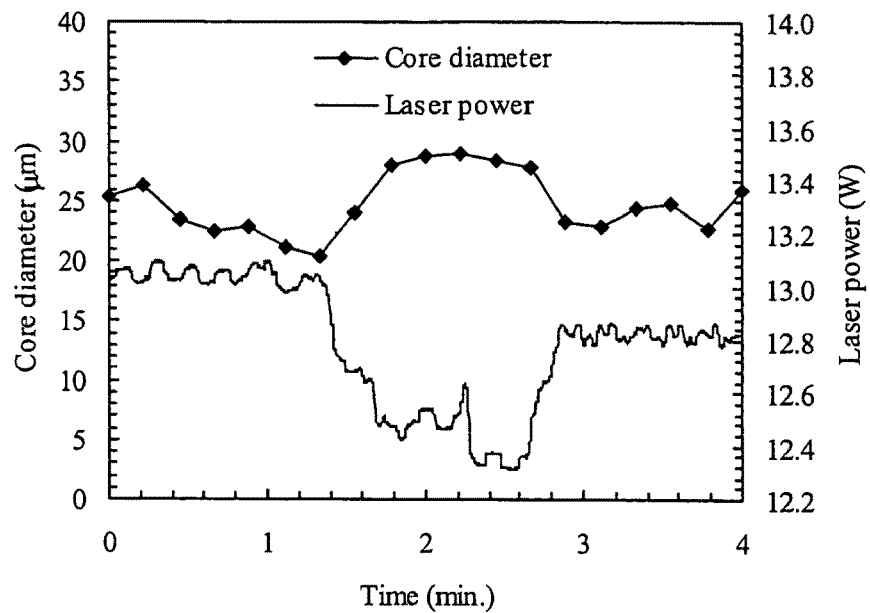
FIG. 6 is a core diameter-laser power curve obtained from the fabrication of a double-clad crystal fiber by means of sapphire tube radiation heating according to the present invention.

The change of core diameter relative to laser power in the growth of double-clad crystal fiber with or without sapphire tube is observed. When growing a double-clad crystal fiber without a sapphire tube, as shown in FIG. 5, it shows a change of 58.9% in core diameter when laser power is changed by 1%. When growing a double-clad crystal fiber with a sapphire tube, as shown in FIG. 6, it shows a change of 5.88% in core diameter when laser power is changed by 1%. Apparently, the thermal capacitance effect of the sapphire tube effectively improves the problem of significant variation of the core diameter with the variation of the applied laser power.

Figure 7:
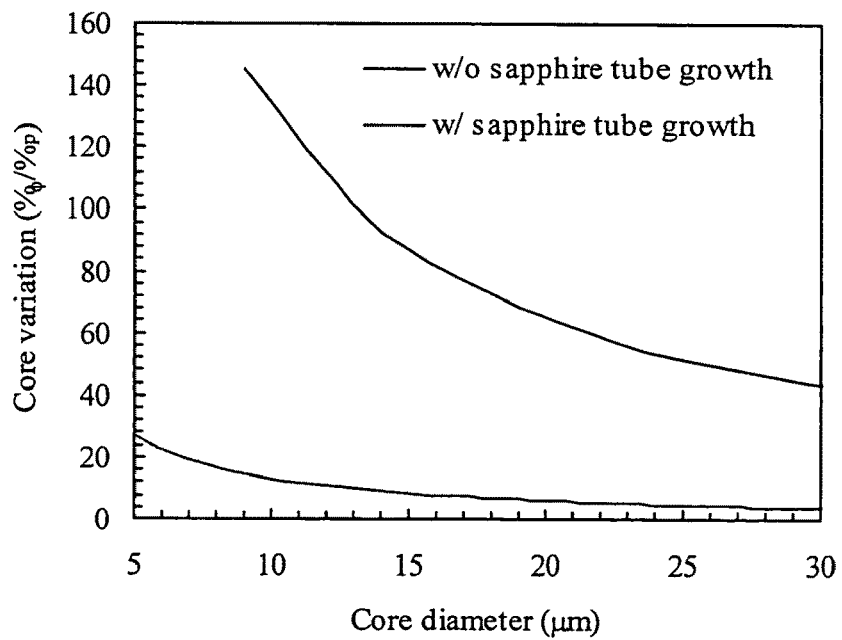
FIG. 7 is a core diameter-core variation curve obtained from the fabrication of a double-clad crystal fiber with and without sapphire tube according to the present invention.

Referring to FIG. 7, the application of the present invention can grow a double-clad crystal fiber of core diameter 5±25 μm. Reducing core diameter to below 5 μm has the benefits of: (a) reducing the number of modes and lowering transmission loss, and (b) improving the conversion efficiency of Cr:YAG crystal fiber in spontaneous emission to amplify light source. Further, when fused with glass fiber, it greatly reduces insertion loss due to a different core sectional area. In general, Cr:YAG double-clad crystal fiber can be used for making high-efficiency, low transmission loss spontaneous emission optical amplifier for all-optical network.

What is claimed is:

1. An optical fiber fabrication method comprising the steps of (a) preparing a fiber, (b) inserting said fiber into a silica capillary, (c) inserting said fiber and silica capillary into a sapphire tube in such a way that an annular space is formed between said silica capillary and said tube, and (d) applying a laser beam to said tube to increase the temperature of said tube and to fuse said silica capillary with thermal absorption via said annular space to have the fused silica capillary be wrapped about said fiber.

2. The optical fiber fabrication method as claimed in claim 1, wherein said laser beam is $CO_2$ laser beam.

3. The optical fiber fabrication method as claimed in claim 1, wherein said laser beam is focused onto an annular heating zone on said tube, causing axis symmetrical temperature distribution.

4. The optical fiber fabrication method as claimed in claim 1, wherein said fiber is a Cr:YAG fiber.

5. The optical fiber fabrication method as claimed in claim 4, wherein the Cr:YAG fiber has a diameter of 0.07 millimeter, the silica capillary has an outer diameter of 0.32 millimeter and inner diameter 0.076 millimeter, and the tube has a length of 1.5 millimeter, outer diameter of 1.2 millimeter and inner diameter of 0.48 millimeter in laser focus, and a $CO_2$ laser is applied to the tube within the height of about 0.44 millimeter to produce thermal radiation, thereby heating the silica capillary, causing the fused silica capillary to be wrapped about the fiber.

6. The optical fiber fabrication method as claimed in claim 1, wherein said fiber is a glass fiber.

7. The optical fiber fabrication method as claimed in claim 1, wherein the annular space is an annular heating zone of 0.44 millimeters such that the temperature distribution is axis symmetrical.

8. The optical fiber fabrication method as claimed in claim 7, wherein the temperature variation from the inside to the outside of said optical fiber is within 1° C.

* * * * *